US009008880B2

(12) United States Patent
Sangameswaran et al.

(10) Patent No.: US 9,008,880 B2
(45) Date of Patent: Apr. 14, 2015

(54) METHOD AND SYSTEM FOR A PLUG-IN HYBRID ELECTRIC VEHICLE

(71) Applicant: Ford Global Technologies, LLC, Dearborn, MI (US)

(72) Inventors: Sangeetha Sangameswaran, Canton, MI (US); Ryan J. Skaff, Farmington Hills, MI (US); Paul Aldighieri, Grosse Pointe Farms, MI (US); Dale Gilman, Beverly Hills, MI (US); Robert David Hancasky, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 13/942,441

(22) Filed: Jul. 15, 2013

(65) Prior Publication Data

US 2015/0019054 A1  Jan. 15, 2015

(51) Int. Cl.
*B60W 20/00* (2006.01)
*B60K 35/00* (2006.01)
*G01F 23/00* (2006.01)

(52) U.S. Cl.
CPC .............. *B60K 35/00* (2013.01); *G01F 23/00* (2013.01); *B60K 2350/352* (2013.01); *Y10S 903/903* (2013.01); *B60W 20/1086* (2013.01); *Y10S 903/93* (2013.01)

(58) Field of Classification Search
None
See application file for complete search history.

(56) References Cited

U.S. PATENT DOCUMENTS

| 7,980,342 | B2* | 7/2011 | Andri ..................... 180/65.28 |
|---|---|---|---|
| 8,177,006 | B2 | 5/2012 | Leone |
| 2004/0172172 | A1* | 9/2004 | Kubota et al. ................. 701/1 |
| 2005/0154505 | A1* | 7/2005 | Nakamura et al. ............. 701/1 |
| 2008/0167788 | A1 | 7/2008 | Tate et al. |
| 2009/0204316 | A1* | 8/2009 | Klampfl et al. ............ 701/123 |
| 2010/0198438 | A1* | 8/2010 | Iraha et al. .................. 701/22 |
| 2011/0010030 | A1 | 1/2011 | Yamamoto |
| 2011/0118921 | A1 | 5/2011 | Park et al. |
| 2011/0137470 | A1* | 6/2011 | Surnilla et al. ............. 700/282 |
| 2011/0288738 | A1* | 11/2011 | Donnelly et al. ............ 701/99 |
| 2013/0030616 | A1* | 1/2013 | Syed et al. .................. 701/22 |
| 2013/0144519 | A1* | 6/2013 | Nakano et al. ............ 701/123 |
| 2013/0151056 | A1* | 6/2013 | Nakano ...................... 701/22 |
| 2013/0173106 | A1* | 7/2013 | Konishi ...................... 701/22 |
| 2013/0211641 | A1* | 8/2013 | Fujii .......................... 701/22 |
| 2013/0226443 | A1* | 8/2013 | Scofield et al. ............ 701/123 |
| 2014/0058647 | A1* | 2/2014 | Haladyna et al. .......... 701/104 |
| 2014/0107906 | A1* | 4/2014 | Jentz et al. ................. 701/102 |
| 2014/0114511 | A1* | 4/2014 | Sangameswaran et al. .... 701/22 |
| 2014/0316624 | A1* | 10/2014 | Aoki .......................... 701/22 |
| 2014/0330482 | A1* | 11/2014 | Yang et al. ................ 701/34.4 |

OTHER PUBLICATIONS

Nation Highway Traffic Safety Administration, "Fuel Economy Driver Interfaces: Design Range and Driver Opinions: Report on Task 1 and Task 2," DOT HS 811 092, U.S. Department of Transportation, Aug. 2009, 90 pages.

* cited by examiner

*Primary Examiner* — Thomas Tarcza
*Assistant Examiner* — Richard Goldman
(74) *Attorney, Agent, or Firm* — David Kelley; Alleman Hall McCoy Russell & Tuttle LLP (57) ABSTRACT

Methods and systems are provided for displaying a recommended engine fuel fill amount to an operator of a plug-in hybrid electric vehicle. In one example, the recommended engine fuel fill amount is determined based on an actual amount of fuel consumed over a particular duration and displayed to an operator of the vehicle with a low fuel warning.

20 Claims, 5 Drawing Sheets

METHOD AND SYSTEM FOR A PLUG-IN HYBRID ELECTRIC VEHICLE

FIELD

The present application relates to displaying a recommended engine fuel fill amount in vehicles such as plug-in hybrid electric vehicles.

BACKGROUND AND SUMMARY

Reduced engine operation times in plug-in hybrid electric vehicles (PHEVs) enable fuel economy and reduced fuel emissions benefits. However, the shorter engine operation times can lead to longer refueling intervals ultimately resulting in fuel in a fuel tank of the vehicle becoming old, or sour. Fuel souring may cause acid formation and/or waxing, for example.

One approach to address potential souring of on-board fuel is to force engine on operation to a greater extent, even if not needed. However, the inventors herein have recognized a problem with such an approach. Namely, user satisfaction with the plug-in vehicle may become degraded because the user may be aiming to minimize addition of fuel, and forcing engine operation to utilize stale fuel is directly contrary to the user's goal.

Thus, the inventors herein have devised an approach to at least partially address the issue described above. In one example, a method for a vehicle including an engine and a motor includes displaying a recommended engine fuel fill amount based on a history of actual fuel usage. As an example, the recommended engine fuel fill amount may be determined based on an amount of fuel consumed over a duration, such as since a last fuel refill.

In this way, forced engine operation may be reduced such that user satisfaction may be improved. For example, by determining the amount of fuel consumed since the last fuel refill, an operator of the vehicle may be informed of his/her fuel usage via a display in the vehicle. As such, when the operator refills a fuel tank of the vehicle, the operator may refill the fuel tank with just enough fuel for a selected duration (e.g., three months) such that fuel souring may be prevented. Further, as the operator follows the recommended fuel fill amount, a frequency of forced engine operation (e.g., a fuel maintenance mode) may be reduced, as there is no longer excess fuel that needs to be consumed before souring can occur.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
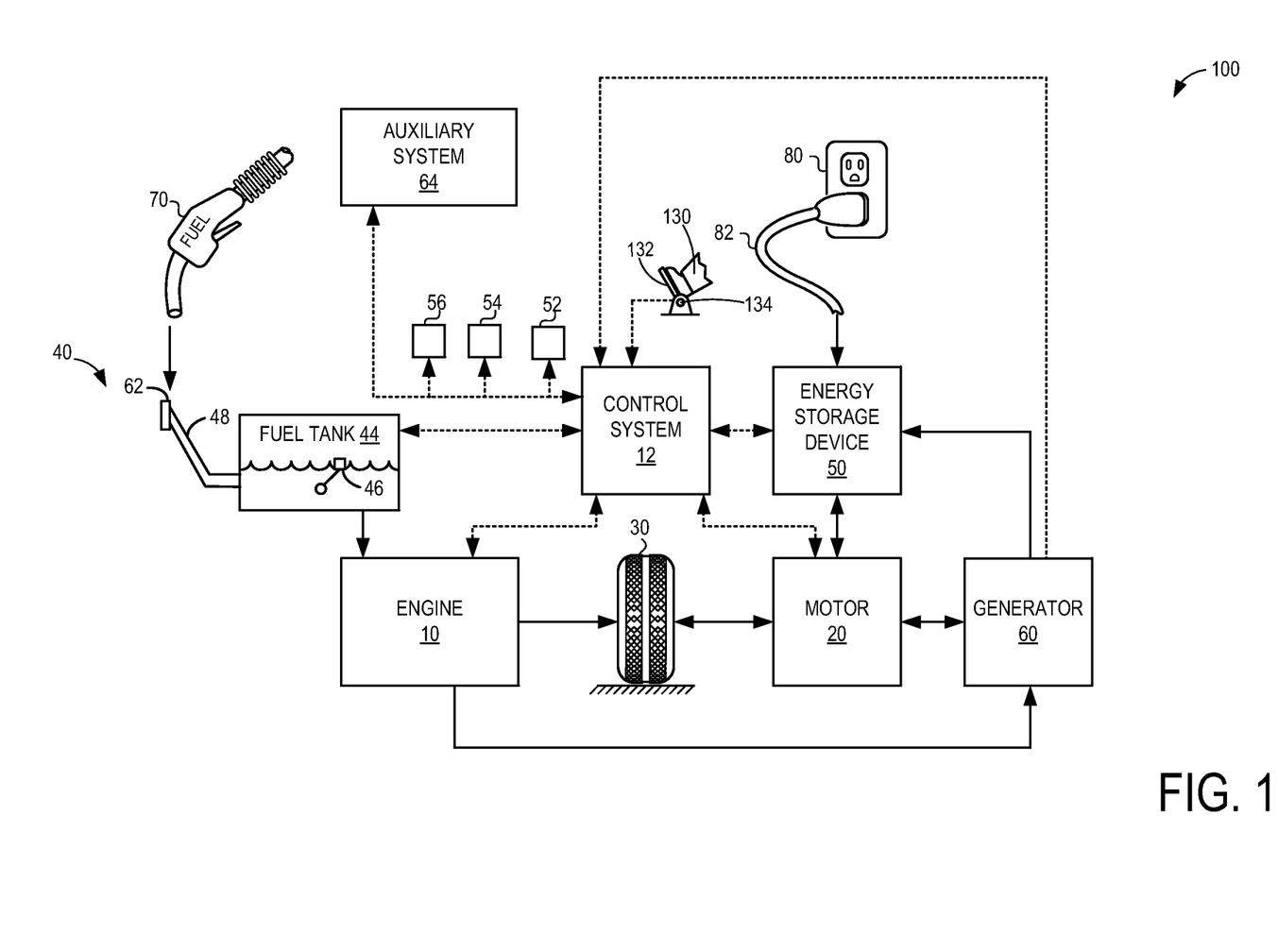
FIG. 1 illustrates an example plug-in hybrid electric vehicle system.

The following description relates to systems and methods for operating a hybrid electric vehicle, such as the plug-in hybrid electric vehicle of FIG. 1. Based on an actual history of fuel usage, a recommended engine fuel fill amount is displayed to an operator of the vehicle such that forced engine operation may be reduced. For example, during a fuel maintenance mode of vehicle operation, the engine is operated to consume a selected amount of fuel responsive to engine off operation lasting greater than a first duration, as described with reference to FIG. 2. Based on an amount of fuel consumed over a second duration while the vehicle is not in the fuel maintenance mode, a recommended engine fuel fill amount is displayed to the operator of the vehicle, as described with reference to FIG. 4. FIGS. 3 and 5-7 show example displays indicating the recommended engine fuel fill amount. When the operator follows the fuel fill recommendation, a frequency of fuel maintenance mode operation may be reduced, for example. Further, when the fuel fill recommendation is followed, fuel souring may be prevented without forced engine operation, thereby improving user satisfaction.

Continuing to FIG. 1, an example vehicle propulsion system 100 is illustrated. The vehicle propulsion system 100 includes a fuel burning engine 10 and a motor 20. As a non-limiting example, the engine 10 comprises an internal combustion engine and the motor 20 comprises an electric motor. The motor 20 may be configured to utilize or consume a different energy source than the engine 10. For example, the engine 10 may consume a liquid fuel (e.g., gasoline) to produce an engine output while the motor 20 may consume electrical energy to produce a motor output. As such, a vehicle with the propulsion system 100 may be referred to as a hybrid electric vehicle (HEV). Specifically, the propulsion system 100 is depicted herein as a plug-in hybrid electric vehicle (PHEV).

The vehicle propulsion system 100 may be operated in a variety of different modes depending on vehicle operating conditions. Some of these modes may enable the engine 10 to be maintained in an off state (or deactivated state) where combustion of fuel at the engine is discontinued. For example, under select operating conditions, the motor 20 may propel the vehicle via a drive wheel 30 while the engine 10 is deactivated.

During other operating conditions, the engine 10 may be deactivated while the motor 20 is operated to charge an energy storage device 50 via regenerative braking Therein, motor 20 may receive wheel torque from the drive wheel 30 and convert the kinetic energy of the vehicle to electrical energy for storage at the energy storage device 50. Thus, the motor 20 can provide a generator function in some embodiments. However, in other embodiments, a dedicated energy conversion device, herein a generator 60 may, instead, receive wheel torque from the drive wheel 30 and convert the kinetic energy of the vehicle to electrical energy for storage at the energy storage device 50.

During still other operating conditions, the engine 10 may be operated by combusting fuel received from a fuel system 40. For example, the engine 10 may be operated to propel the vehicle via the drive wheel 30 while the motor 20 is deactivated. During other operating conditions, both the engine 10 and the motor 20 may each be operated to propel the vehicle via the drive wheel 30. A configuration in which both the engine and the motor may selectively propel the vehicle may be referred to as a parallel type vehicle propulsion system. Note that in some embodiments, the motor 20 may propel the vehicle via a first set of drive wheels and the engine 10 may propel the vehicle via a second set of drive wheels.

In other embodiments, the vehicle propulsion system 100 may be configured as a series type vehicle propulsion system, whereby the engine does not directly propel the drive wheels. Rather, the engine 10 may be operated to power the motor 20, which may in turn propel the vehicle via the drive wheel 30. For example, during select operating conditions, the engine 10 may drive the generator 60, which may in turn supply electrical energy to one or more of the motor 20 or the energy storage device 50. As another example, the engine 10 may be operated to drive the motor 20 which may in turn provide a generator function to convert the engine output to electrical energy, where the electrical energy may be stored at the energy storage device 50 for later use by the motor. The vehicle propulsion system may be configured to transition between two or more of the operating modes described above depending on operating conditions.

The fuel system 40 may include one or more fuel storage tanks 44 for storing fuel on-board the vehicle and for providing fuel to the engine 10. For example, the fuel tank 44 may store one or more liquid fuels, including but not limited to: gasoline, diesel, and alcohol fuels. In some examples, the fuel may be stored on-board the vehicle as a blend of two or more different fuels. For example, the fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to the engine 10, where they may be combusted at the engine 10 to produce an engine output. The engine output may be utilized to propel the vehicle and/or to recharge the energy storage device 50 via the motor 20 or the generator 60.

The operator of the PHEV may try to maximize an amount of operation in which the motor propels the vehicle (e.g., electric vehicle operation) and the engine 10 is set to a deactivated state, or engine-off mode, where consumption of fuel by the engine is significantly reduced or discontinued. As such, there may be long intervals between refueling events, and fuel in the fuel tank 44 may become old and stale (e.g., the fuel may sour). For example, the fuel may sour after sitting in the fuel tank 44 unused for a duration between nine months and one year. Fuel souring may cause issues such as acid formation and waxing (e.g., oxidation of olefins to peroxides). Thus, in some embodiments, the vehicle may be operated in a fuel maintenance mode in which the engine is turned on after an indication of stale fuel is received, as described with reference to FIG. 2. In this way, consumption of the fuel in the fuel tank is forced such that fuel souring will not occur. Further, as will be described with reference to FIG. 4, a control system 12 may calculate an amount of fuel that is used during engine operation, not including fuel used during the fuel maintenance mode, and a recommended engine fuel fill amount may be displayed to the operator based on the calculated amount. As such, the operator may fill the tank with only an amount of fuel that he or she needs over a selected duration (e.g., three months, six months, etc.), thereby reducing the need for forced engine operation.

The fuel tank 44 may include a fuel level sensor 46 for sending a signal regarding a fuel level in the tank to the control system (or controller) 12. The fuel level sensor 46 may comprise a float connected to a variable resistor, as shown. Alternatively, other types of fuel level sensors may be used. The level of fuel stored in the fuel tank 44 (e.g., as identified by the fuel level sensor) may be communicated to the vehicle operator, for example, via a fuel gauge or indication lamp on a vehicle display indicated at 52. Further, a recommended fuel fill amount may be communicated to the operator via the vehicle display. In one example, the recommended fuel fill amount may be displayed with a low fuel warning. In other examples, the recommended fuel fill amount may be displayed when a fuel door 62 is opened. The fuel system 40 may periodically receive fuel from an external fuel source. For example, in response to a fuel level in the fuel tank falling below a threshold, a fuel tank refill request may be made (e.g., a low fuel warning) and the vehicle operator may stop the vehicle for refilling. Fuel may be pumped into the fuel tank from fuel a dispensing device 70 via a refueling line 48 that forms a passageway from the fuel door 62 located on an outer body of the vehicle.

Figure 2:
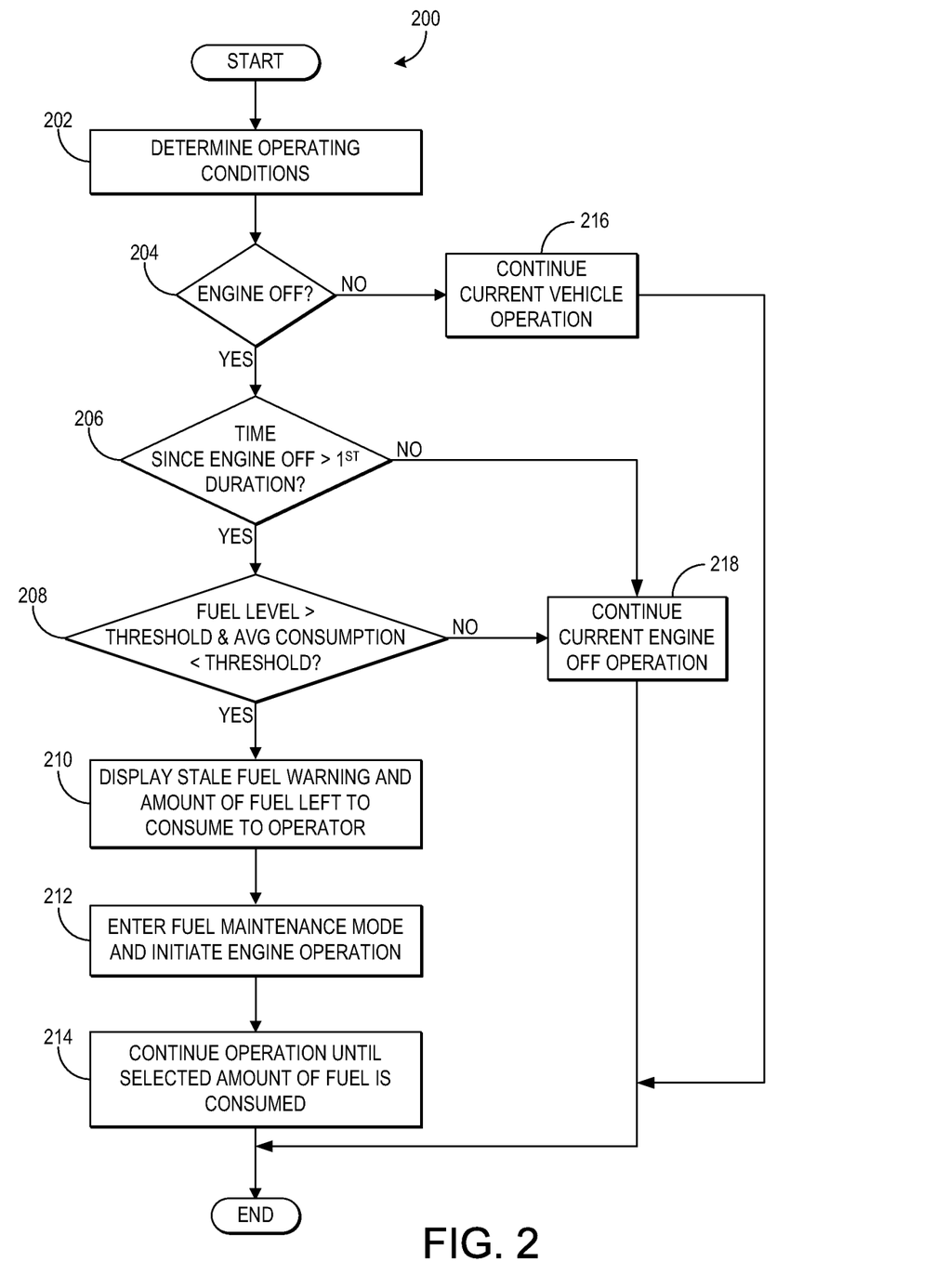
FIG. 2 shows a flow chart illustrating a routine for a fuel maintenance mode of operation of a plug-in hybrid electric vehicle.
Figure 4:
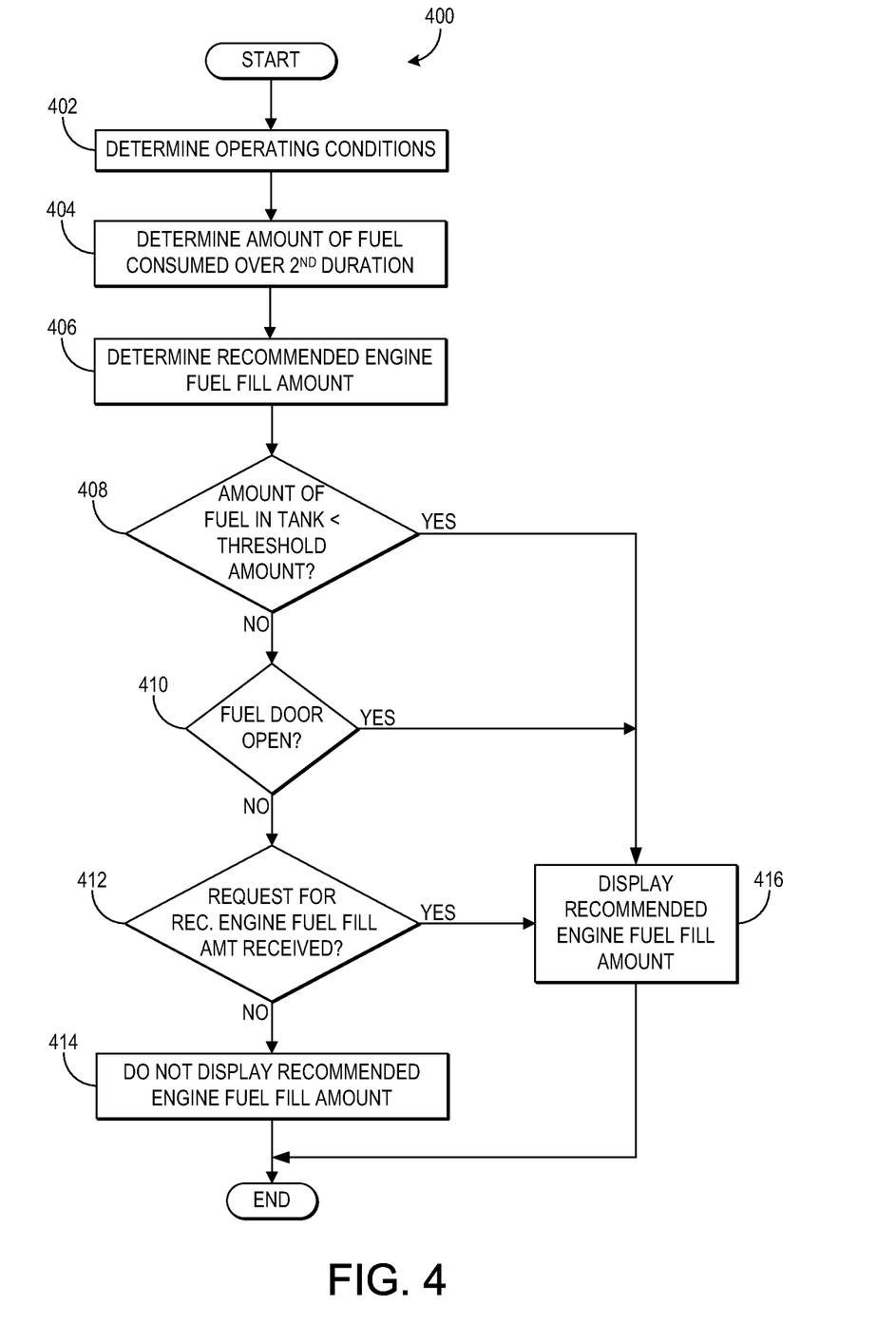
FIG. 4 shows a flow chart illustrating a routine for displaying a recommended engine fuel fill amount in a plug-in hybrid electric vehicle.

As elaborated herein with reference to FIGS. 2 and 4, the control system 12 may be configured to determine a recommended engine fuel fill amount. The recommended fuel fill amount may be estimated based on an actual history of fuel usage. For example, the recommended fuel fill amount may be estimated based on an amount of fuel used over a particular duration (e.g., three months, six months, etc.) or since a last refueling event. In some embodiments, the duration may be based on information from a real-time clock 56 coupled to the control system 12, which may be configured to provide a real-time estimate of time. Further still, the duration may be estimated based on information from an auxiliary system 64 of the vehicle. The auxiliary system may be, for example, a vehicle navigation system (such as a GPS), or an entertainment system (e.g., radio, DVD player, stereo system, etc.). In one example, where the auxiliary system 64 is a vehicle navigation system, location and time data may be transmitted between the control system 12 of the vehicle and a global positioning satellite via wireless communication.

In one example, the fuel gauge 52, an odometer 54, the clock 56, and the auxiliary system 64 may be coupled to a message center, or display (not shown in FIG. 1) on the vehicle's dashboard. The message center may include indicator light(s) and/or a text-based display in which messages are displayed to an operator, such as a message requesting an operator input to refill the fuel tank or start the engine.

The control system 12 may communicate with one or more of the engine 10, the motor 20, the fuel system 40, the energy storage device 50, and the generator 60. Specifically, the control system 12 may receive feedback from one or more of the engine 10, the motor 20, the fuel system 40, the energy storage device 50, and the generator 60 and send control signals to one or more of them in response. The control system 12 may also receive an indication of an operator requested output of the vehicle propulsion system from a vehicle operator 130. For example, the control system 12 may receive feedback from a pedal position sensor 134 which communicates with a pedal 132. The pedal 132 may refer schematically to an accelerator pedal (as shown) or a brake pedal.

Further, the control system 12 may receive input data from various sensors, process the input data, and trigger various actuators in response to the processed input data based on instruction or code programmed therein corresponding to one or more routines. The control system 12 may include a storage medium, such as read-only memory which can be programmed with non-transitory computer readable data representing instructions executable by a processor for performing the methods and routines described below as well as other variants that are anticipated but not specifically listed. Example control routines are described herein with regard to FIGS. 2 and 4.

The energy storage device 50 may include one or more batteries and/or capacitors. The energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

The energy storage device 50 may periodically receive electrical energy from an external power source 80 not residing in the vehicle. As a non-limiting example, the vehicle propulsion system 100 may be configured as a plug-in hybrid electric vehicle (PHEV), whereby electrical energy may be supplied to the energy storage device 50 from a power source 80 via an electrical energy transmission cable 82. During a recharging operation of the energy storage device 50 from the power source 80, the electrical transmission cable 82 may electrically couple the energy storage device 50 and the power source 80. While the vehicle propulsion system is operated to propel the vehicle, the electrical transmission cable 82 may be disconnected between the power source 80 and the energy storage device 50. The control system 12 may estimate and/or control the amount of electrical energy stored at the energy storage device, referred to herein as the state of charge (SOC).

In other embodiments, the electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging the energy storage device 50 from the external power source 80. In this way, the motor 20 may propel the vehicle by utilizing an energy source other than the fuel utilized by the engine 10.

Thus, FIG. 1 shows a PHEV propulsion system which may be operated in a variety of different modes depending on vehicle operating conditions. When the PHEV is operated in the electric mode in which the engine is off for greater than a threshold duration, a fuel maintenance mode may be initiated in order to reduce a chance of fuel souring. However, when the operator follows the displayed recommended engine fuel fill amount, a frequency of fuel maintenance mode operation may be reduced, as described in greater detail with reference to FIGS. 2 and 4.

Continuing to FIG. 2, a flow chart illustrating a routine 200 for carrying out a fuel maintenance mode in a PHEV propulsion system, such as the vehicle propulsion system 100 described above with reference to FIG. 1. Specifically, the routine initiates the fuel maintenance mode based on an indication of stale fuel responsive to engine-off operation lasting for greater than a threshold duration, and further based on a fuel level and average consumption of the fuel. The fuel maintenance mode is carried out until a selected amount of fuel is consumed by the engine, for example. In this manner, engine operation may be forced in order to prevent fuel souring.

At 202, vehicle operating conditions are determined. As non-limiting examples, the operating conditions may include mode of operation (e.g., engine only, motor only, engine and motor), duration of current mode of operation, fuel level, average fuel consumption, etc.

Once the vehicle operating conditions are determined, the routine continues to 204 where it is determined if the engine is off. For example, engine-off operation includes operation in which a crankshaft of the engine is not spinning and cylinders of the engine are not combusting fuel. If it is determined that the engine is not off (e.g., the engine is in operation), the routine moves to 216 where current vehicle operation is continued.

On the other hand, if it is determined that the engine is off, the routine proceeds to 206 where it is determined if a time over which the engine has been off is greater than a first duration. The first duration may be a duration which is less than a duration over which fuel souring may occur. As examples, the duration may be a number of days or months (e.g., 25 days, one month, two months, four months, etc.). If it is determined that the engine has been off for less than the first duration, the routine moves to 218 where current engine off operation is continued.

On the other hand, if it is determined that the engine has been off for a duration greater than the first duration, the routine continues to 208 where it is determined if a fuel level in the fuel tank is greater than a threshold level and if an average fuel consumption is less than a threshold fuel consumption. For example, based on the vehicle operator's average fuel consumption, or a history of fuel usage, and the current amount of fuel in the tank, it may be determined that not all of the fuel in the tank will be used before souring may occur.

If it is determined that the fuel level is less than the threshold level and the average fuel consumption is greater than the threshold fuel consumption, the routine moves to 218 and current engine off operation is continued. On the other hand, if it is determined that the fuel level in the fuel tank is greater than the threshold level and the average fuel consumption is less than the threshold fuel consumption, the routine proceeds to 210 where a stale fuel warning is displayed with an amount of fuel left to consume. The amount of fuel left to consume may be a selected amount of fuel which may vary with each cycle of fuel maintenance mode. For example, the selected amount may be five gallons at the start of one cycle and two gallons at the start of another cycle. The selected amount may be based on a total amount of fuel in the fuel tank; for example, the selected amount may be greater when there is more fuel in the fuel tank and smaller when there is less fuel in the fuel tank. As the current cycle of fuel maintenance mode progresses, the amount left to consume decreases.

Figure 3:
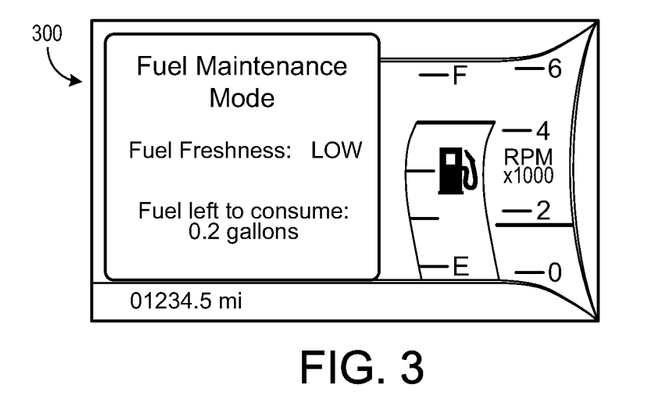
FIG. 3 shows an example of a display in a plug-in hybrid electric vehicle.

FIG. 3 shows an example of a fuel maintenance mode display 700 which includes a stale fuel warning (e.g., low fuel freshness). As depicted in FIG. 3, the display 700 shows that the fuel freshness is low and shows a number of gallons of fuel left to be consumed during the fuel maintenance mode (0.2 gallons in the example of FIG. 3). In some examples, the display may further include a number of gallons to be consumed before fuel maintenance mode may force engine operation to consume the fuel.

Continuing with FIG. 2, once the stale fuel warning is displayed at 210, the routine proceeds to 212 where the vehicle system enters the fuel maintenance mode of operation and engine operation is initiated such that the engine starts combusting fuel. In some examples, engine operation may be automatically initiated by the control system under selected operating conditions, such as when the vehicle is travelling at a high speed or the next time the vehicle is started, for example. In other examples, the operator may be instructed to initiate vehicle operation via a display on a dashboard of the vehicle.

At 214, engine operation is continued until a selected amount of fuel is consumed. Once the selected amount of fuel is consumed, the engine may be shut down, for example, and the motor may be turned on to propel the vehicle. In other examples, once the selected amount of fuel is consumed, the operator may choose to continue operating the vehicle in the engine on mode.

Thus, a routine for carrying out the fuel maintenance mode of vehicle operation is shown in FIG. 2. When engine off operation has continued for greater than a threshold duration, the fuel maintenance mode may be initiated based on the amount of fuel the engine is predicted to consume based on the history of fuel usage. In this way, engine operation is forced. However, when the operator follows a recommended engine fuel fill amount (described below with reference to FIG. 4), a frequency of fuel maintenance mode operation may be reduced. For example, there may be less fuel in the tank, such that even if the vehicle has been operating in a motor only mode with the engine off for greater than the first duration, engine operation may not be initiated, as the average fuel consumption may be greater than the threshold consumption and/or the amount of fuel in the fuel tank may be less than the threshold amount. When the frequency of forced engine operation is reduced, operator satisfaction may be improved, for example.

Continuing to FIG. 4, a routine for displaying a recommended engine fuel fill amount is shown. Specifically, the routine determines the recommended engine fuel fill amount based on actual fuel usage over a duration, and displays the recommended amount to the operator of the vehicle under various conditions. In this manner, the operator is informed about how much fuel he or she should add to the fuel tank during a fuel refill event.

At 402, vehicle operating conditions are determined. As non-limiting examples, the operating conditions may include mode of operation (e.g., engine only, motor only, engine and motor), duration of current mode of operation, fuel level, average fuel consumption, etc.

Once the operating conditions are determined, the routine continues to 404 where an amount of fuel consumed over a second duration is determined. As an example, the amount of fuel consumed may be estimated based on output from a fuel level sensor and a real-time clock, such as the fuel level sensor 46 and real-time clock 56 described above with reference to FIG. 1, for example. In other examples, the amount of fuel may be determined based on an amount of fuel injected to the engine during engine on operation. Further, the amount of fuel consumed over the second duration does not include any amount of fuel consumed during fuel maintenance mode operation which may occur during the second duration. Likewise, the amount of fuel consumed over the second duration may not include any amount of fuel consumed during irregular operation, such as infrequent long trips. In this way, the amount of fuel consumed over the second duration is only representative of the amount of fuel the engine consumed during regular engine on operation which was initiated by and desired by the vehicle operator.

In some examples, the second duration may be a duration, such as three months, six months, etc. The duration may be a variable amount of time which is set by the vehicle operator or the duration may be set by the control system. In other examples, the second duration may be a period of time it takes the fuel to reach a selected level (e.g., one gallon, a lowest nominal detectable level, etc.) since a last refueling event (e.g., the last time the fuel tank was filled with fuel). In some examples, the second duration may be shorter than the first duration described above with reference to FIG. 2. As such, the operator may be notified of how much fuel to refill the fuel tank with before the fuel maintenance mode begins, thereby enabling a reduced frequency of fuel maintenance mode operation when the recommended amount is followed. In other examples, the second duration may be longer than the first duration.

Once the amount of fuel consumed over the second duration is determined, a recommended engine fuel fill amount is determined at 406 based on the amount of fuel determined at 404. In one example, the recommended fuel fill amount may be equal to the amount of fuel consumed over the second duration. In another example, the recommended fuel fill amount may be slightly more than the amount of fuel consumed over the second duration. Further, the recommended engine fuel fill amount may be an amount of fuel averaged over several durations. As an example, the recommended fuel fill amount may be an average amount of fuel consumed over the previous four three month durations. As described below, the vehicle operator may be notified of the recommended engine fuel fill amount via a display on a dashboard of the vehicle such that he or she may fill the fuel tank with the recommended amount of fuel during a subsequent refueling event.

At 408 it is determined if the amount of fuel in the fuel tank is less than a threshold amount of fuel. As an example, the threshold amount of fuel may be an amount at which a low fuel warning is displayed to notify the operator, such as one gallon or two gallons. If it is determined that the amount of fuel in the fuel tank is less than the threshold amount of fuel, the routine moves to 416 where the recommended engine fuel fill amount is displayed. For example, the recommended fuel fill amount may be displayed in a low fuel warning display.

Figure 5:
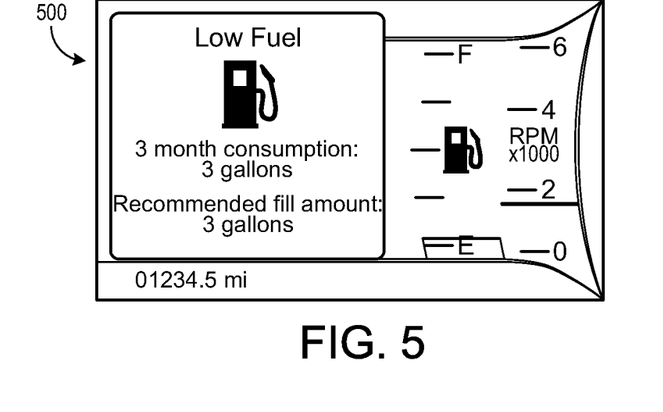
FIGS. 5-7 show examples of a display in a plug-in hybrid electric vehicle.

FIG. 5 shows an example of a low fuel warning display 500. As depicted, the display 500 shows the amount of fuel consumed over the past three months (3 gallons in the example of FIG. 5) and the recommended engine fuel fill amount (3 gallons in the example of FIG. 5). In this example, the recommended fuel fill amount is equal to the amount of fuel consumed over the past three months. In other examples, the recommended fuel fill amount may be greater than or less than the amount of fuel consumed over the past three months, depending on whether the recommended amount is based on the amount of fuel consumed in the previous three month duration or an average of several three month durations, for example.

Continuing with FIG. 4, if the amount of fuel in the fuel tank is greater than the threshold amount, the routine proceeds to 410 where it is determined if the fuel door is open or being opened. For example, when the fuel door is opened, the control system may assume the fuel tank is about to be refilled, as such, the recommended engine fuel fill amount is displayed at 416.

Figure 6:
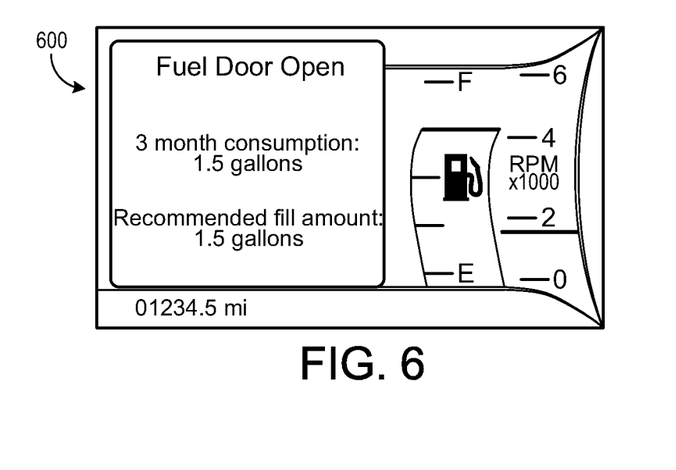

FIG. 6 shows an example of a display 600 which may be displayed when the fuel door is open or being opened. As shown, the display 600 shows that the fuel door is open, as well as the three month fuel consumption (1.5 gallons in the example of FIG. 6), and the recommended engine fuel fill amount (1.5 gallons in the example of FIG. 6). In this example, the recommended fuel fill amount is equal to the amount of fuel consumed over the past three months. In other examples, the recommended fuel fill amount may be greater than or less than the amount of fuel consumed over the past three months, depending on whether the recommended amount is based on the amount of fuel consumed in the previous three month duration or an average of several three month durations, for example.

Continuing with FIG. 4, if it is determined that the fuel door is closed, the routine proceeds to 412 where it is determined if a request to display the recommended engine fuel fill amount has been received. For example, the vehicle operator may request to see the recommended fuel fill amount to get idea of how much fuel he or she has consumed over the second duration. Thus, responsive to the request from the operator, the recommended engine fuel fill amount is displayed at 416 on-demand.

Figure 7:
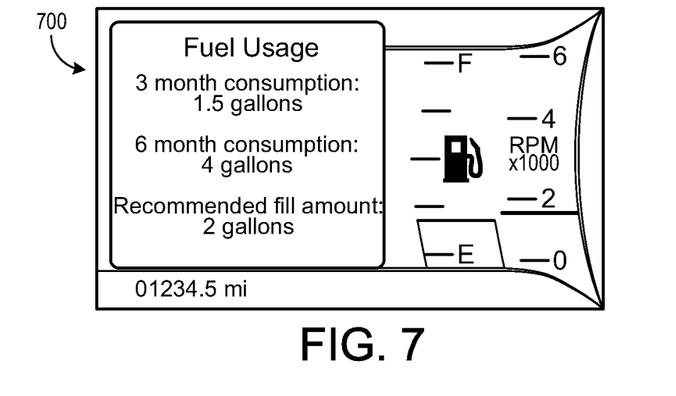

FIG. 7 shows an example of a display 700 showing fuel consumption information responsive to a request from the vehicle operator. As depicted, the display 700 shows the three month consumption (1.5 gallons in the example of FIG. 7), the six month consumption (4 gallons in the example of FIG. 7), and the recommended engine fuel fill amount (2 gallons in the example of FIG. 7). In this example, the recommended amount is an amount of fuel to last for a three month duration based on the amount used over six months. In other examples, the recommended amount of fuel may be an amount to last for a six month duration or another suitable duration.

Continuing with FIG. 4, if it is determined that the amount of fuel in the tank is greater than the threshold amount at 412, the fuel door is closed, and the operator has not requested the recommended fuel fill amount to be displayed, the routine continues to 414 and the recommended engine fuel fill amount is not displayed.

Thus, the recommended engine fuel fill amount is determined based on the amount of fuel consumed by the engine over the second duration and does not include any amount of fuel consumed by the engine during a period in which engine operation is forced, such as during the fuel maintenance mode. Under various conditions, the recommended fuel fill amount is displayed to the vehicle operator via the vehicle display. In this manner, the operator may be informed of an amount of fuel with which to fill the fuel tank during a subsequent refueling event. When the recommended engine fuel fill amount is followed by the operator, fuel maintenance mode operation may be reduced, as the fuel in the fuel tank may be consumed well before fuel souring may occur Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle including an engine and a motor, comprising:
 displaying a recommended engine fuel fill amount based on a history of actual fuel usage.

2. The method of claim 1, wherein history of actual fuel usage is an average fuel consumption over a duration of three months.

3. The method of claim 1, wherein the history of actual fuel usage is fuel consumption over a period of time it takes a fuel level to reach a selected level since a last refueling event.

4. The method of claim 1, further comprising, responsive to a stale fuel indication, initiating a fuel maintenance mode in which the engine is turned on and engine operation is continued until a selected amount of fuel is consumed by the engine.

5. The method of claim 4, wherein the stale fuel indication is responsive to engine off operation for a threshold duration.

6. The method of claim 4, reducing a frequency at which the fuel maintenance mode is initiated when the recommended engine fuel fill amount is followed.

7. The method of claim 4, further comprising initiating engine operation responsive to a current fuel level greater than a threshold level and an average fuel consumption less than a threshold fuel consumption 8. The method of claim 1, wherein displaying the fuel fill amount includes displaying the fuel fill amount on-demand responsive to a request from an operator of the vehicle.

9. The method of claim 1, wherein displaying the fuel fill amount includes displaying the fuel fill amount responsive to a fuel door opening or being opened.

10. The method of claim 1, wherein displaying the fuel fill amount includes displaying the fuel fill amount when a low fuel warning is displayed.

11. The method of claim 1, wherein the vehicle is a plug-in hybrid electric vehicle.

12. A method of operating a vehicle including an engine and a motor, comprising:
 during a fuel maintenance mode, initiating engine operation after a first duration over which the engine is off, and continuing engine operation until a selected amount of fuel is consumed by the engine; and
 displaying a recommended fuel fill amount based on an amount of fuel used over a second duration.

13. The method of claim 12, further comprising reducing initiation of the fuel maintenance mode when an operator of the vehicle follows the fuel fill amount recommendation.

14. The method of claim 12, further comprising displaying a remaining amount of fuel to be consumed before the engine is shut down during the fuel maintenance mode.

15. The method of claim 12, wherein the recommended fuel fill amount is not based on the selected amount of fuel consumed during the fuel maintenance mode.

16. The method of claim 12, further comprising, during the fuel maintenance mode, initiating engine operation when a current fuel level is greater than a threshold level and average fuel consumption is less than a threshold fuel consumption.

17. A plug-in hybrid electric vehicle system, comprising:
an engine;
an electric motor;
a fuel tank for providing fuel to the engine, the fuel tank including a fuel level sensor;
a display on a dashboard;
a control system with computer readable instructions for: initiating engine operation in a fuel maintenance mode responsive to engine off operation continuing for a first duration, a current fuel level being greater than a threshold fuel level, and an average fuel consumption being less than a threshold fuel consumption, and continuing engine operation until a threshold amount of fuel is consumed; and displaying on the display a recommended engine fuel fill amount based on a history of actual fuel usage over a second duration.

18. The vehicle system of claim 17, wherein the first duration is shorter than the second duration.

19. The vehicle system of claim 17, wherein the display includes a low fuel warning display, and further comprising instructions for displaying the recommended engine fuel fill amount on the low fuel warning display.

20. The vehicle system of claim 17, wherein the instructions for displaying the recommended engine fuel fill amount include instructions for displaying the recommended engine fuel fill amount responsive to a request from an operator of the vehicle.

* * * * *